(12) United States Patent
Yamamoto et al.

(10) Patent No.: US 7,602,231 B2
(45) Date of Patent: Oct. 13, 2009

(54) CHARGE-PUMP CIRCUIT

(75) Inventors: Yasue Yamamoto, Osaka (JP); Yasuhiro Agata, Osaka (JP); Masanori Shirahama, Shiga (JP); Toshiaki Kawasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 15 days.

(21) Appl. No.: 11/526,060

(22) Filed: Sep. 25, 2006

(65) Prior Publication Data

US 2007/0069803 A1 Mar. 29, 2007

(30) Foreign Application Priority Data

Sep. 29, 2005 (JP) ............................. 2005-284153

(51) Int. Cl.
*G05F 3/24* (2006.01)
*H02M 3/16* (2006.01)
*H01L 27/04* (2006.01)

(52) U.S. Cl. ......................................... 327/536; 363/60

(58) Field of Classification Search .................. None
See application file for complete search history.

(56) References Cited

U.S. PATENT DOCUMENTS

| | | | |
|---|---|---|---|
| 4,581,546 A * | 4/1986 | Allan ........................... 327/536 |
| 5,306,656 A | 4/1994 | Williams et al. |
| 5,892,267 A * | 4/1999 | Takada ......................... 327/536 |
| 5,978,283 A * | 11/1999 | Hsu et al. .................. 365/189.09 |
| 6,028,473 A * | 2/2000 | Kamei et al. .................. 327/536 |
| 6,055,193 A * | 4/2000 | Manning et al. ......... 365/189.11 |
| 6,121,821 A | 9/2000 | Miki |
| 6,313,511 B1 | 11/2001 | Noguchi |
| 6,320,796 B1 | 11/2001 | Voo et al. |
| 6,359,494 B2 * | 3/2002 | Kanda et al. .................. 327/333 |
| 6,590,247 B2 * | 7/2003 | Ghilardelli et al. .......... 257/296 |
| 6,603,346 B2 | 8/2003 | Sawada et al. |

OTHER PUBLICATIONS

"On-Chip High-Voltage Generation in MNOS Integrated Circuits Using an Improved Voltage Multiplier Technique," by J. F. Dickson, IEEE, J. Solid-State Circuits, vol. SC-11, No. 3, pp. 374-378, Jun. 1976.

* cited by examiner

*Primary Examiner*—Lincoln Donovan
*Assistant Examiner*—Terry L Englund
(74) *Attorney, Agent, or Firm*—McDermott Will & Emery LLP (57) ABSTRACT

A circuit includes a plurality of stages each including a MOS transistor and a capacitor of which one end is connected to one of a drain and a source of the MOS transistor. The plurality of stages are connected with each other by cascade connection of the MOS transistors. A gate of the MOS transistor is connected electrically to one of the drain and the source thereof in each stage, and a substrate for at least one pair of adjacent MOS transistors are connected electrically to one of the drain and the source of one of the pair. The back bias effect is suppressed, and the layout area is reduced. Further, a plurality of booster capacitors connected in series are provided in succeeding stages, thereby suppressing degradation of breakdown voltage of each capacitor.

2 Claims, 11 Drawing Sheets

CHARGE-PUMP CIRCUIT

BACKGROUND OF THE INVENTION

The present invention relates to a charge-pump circuit formed on a silicon substrate, and particularly relates to a charge-pump circuit capable of being incorporated in a standard CMOS process LSI.

A charge-pump circuit of Cockcroft-Walton type capable of being formed on a silicon substrate is disclosed in "On-Chip High-Voltage Generation in MNOS Integrated Circuits Using an Improved Voltage Multiplier Technique," by J. F. Dickson, IEEE J. Solid-State Circuits, Vol. SC-11, No. 3, pp. 374-378, June 1976. In this circuit, a booster cell of each stage is composed of a drive MOS transistor of which a drain and a gate are connected to each other and a capacitor, and a voltage of the preceding stage is superimposed on the succeeding booster cell sequentially according to two-phase clock signals to obtain a desired voltage in the booster cell at the final stage.

In the above Cockcroft-Walton charge-pump circuit, as the boosted potential becomes higher, the back bias effect becomes more significant and the threshold voltage of the drive transistor increases, thereby lowering the charge-pump efficiency.

Under the circumstances, U.S. Pat. No. 6,603,346 proposes a technique in which N-type well regions in which drive PMOS transistors are formed are isolated electrically from each other in a P-type silicon substrate and the substrate potential is fixed to the source potential of the drive PMOS transistor in each stage for minimizing the influence of the back bias effect.

Another technique disclosed in U.S. Pat. No. 6,121,821 refers to a case where a triple well structure is employed in a P-type silicon substrate, wherein P-type well regions in which drive NMOS transistors are formed are isolated electrically from each other, and the substrate potential is fixed to the drain potential of the drive NMOS transistor in each stage for minimizing the influence of the back bias effect. The patent introduces a charge-pump circuit of four-phase clock signal type, as well.

Referring to nonvolatile semiconductor memory devices, such as flash memories, EEPROMs, and the like, voltages higher than the power supply voltage is necessary for signal writing and signal erasure. In a flash memory, a high breakdown voltage transistor for withstanding high bias capable of being used in the charge-pump circuit can be fabricated in an exclusive process. In mounting the charge-pump circuit on an advanced standard CMOS process LSI, however, the exclusive process high breakdown voltage transistor cannot be used. Therefore, when each of the capacitors of the charge-pump circuit is composed of a single MOS transistor, a high voltage is applied between the gate and the substrate to cause problems that the breakdown voltage of the capacitor cannot be guaranteed because of time dependent dielectric breakdown (TDDB), and the like. This makes difficult to mount the charge-pump circuit on the advanced standard CMOS process LSI.

Further, electric isolation of the well regions in which the drive MOS transistors are formed as a countermeasure for minimizing the back bias effect necessitates isolation layers between the respective stages, involving an increase in layout area of the charge-pump circuit.

SUMMARY OF THE INVENTION

The present invention provides a charge-pump circuit including a plurality of stages each including a MOS transistor and a capacitor of which one end is connected to one of a drain and a source of the MOS transistor, the plurality of stages being connected with each other by cascade connection of the MOS transistors, wherein a gate of the MOS transistor is connected electrically to one of the drain and the source thereof in each stage, and a substrate for at least one pair of adjacent MOS transistors are connected electrically to one of the drain and the source of one of the pair.

In the above charge-pump circuit, the substrate for at least one pair of adjacent drive MOS transistors is connected electrically to the source or the drain of one of the pair, thereby suppressing the back bias effect to suppress lowering of the charge-pump efficiency. Further, since at least one pair of adjacent MOS transistors share the substrate, no substrate isolation region is needed, reducing the layout area.

Further, in the present invention, the capacitors are connected in series within each stage of the charge-pump circuit to divide the voltage applied to each end of each capacitor, suppressing degradation of the breakdown voltage of the capacitors. This enables the charge-pump circuit to be mounted on an advanced standard CMOS process LSI.

The capacitors may be composed of an N-type depletion MOS (DMOS) transistor or a PMOS transistor. The plural capacitors, which are capable of being isolated by wells, can be connected in series, suppressing degradation of the breakdown voltage thereof.

When each stage includes a MOS transistor fabricated by the same process as the process for fabricating a MOS transistor for an input/output circuit, a charge-pump circuit can be achieved which can be mounted on an advanced standard CMOS process LSI.

DETAILED DESCRIPTION OF THE INVENTION

Embodiments of the present invention will be described below with reference to the accompanying drawings.

Figure 1:
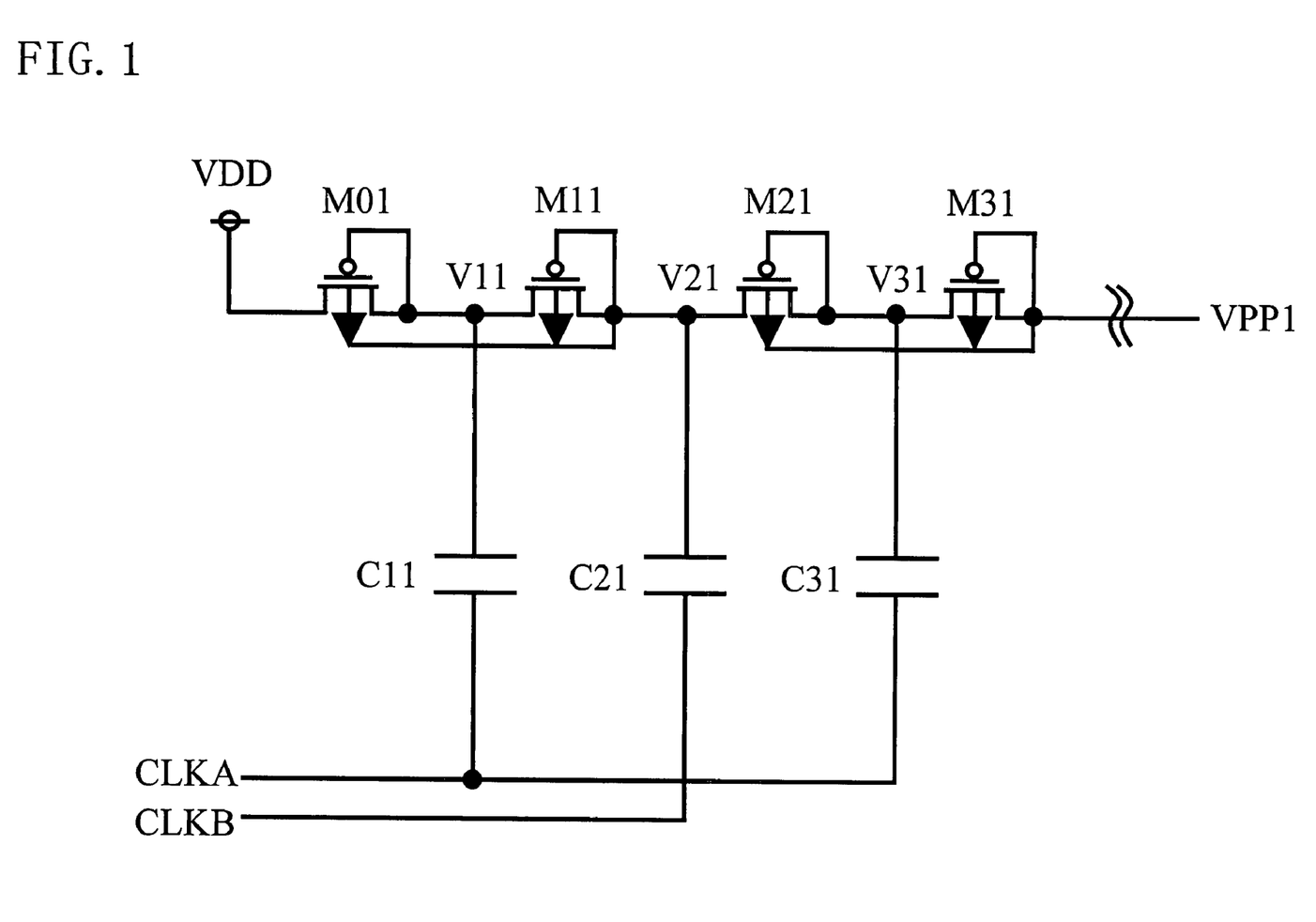
FIG. 1 is a circuit diagram showing a configuration of a charge-pump circuit in Embodiment 1 of the present invention.
Figure 2:
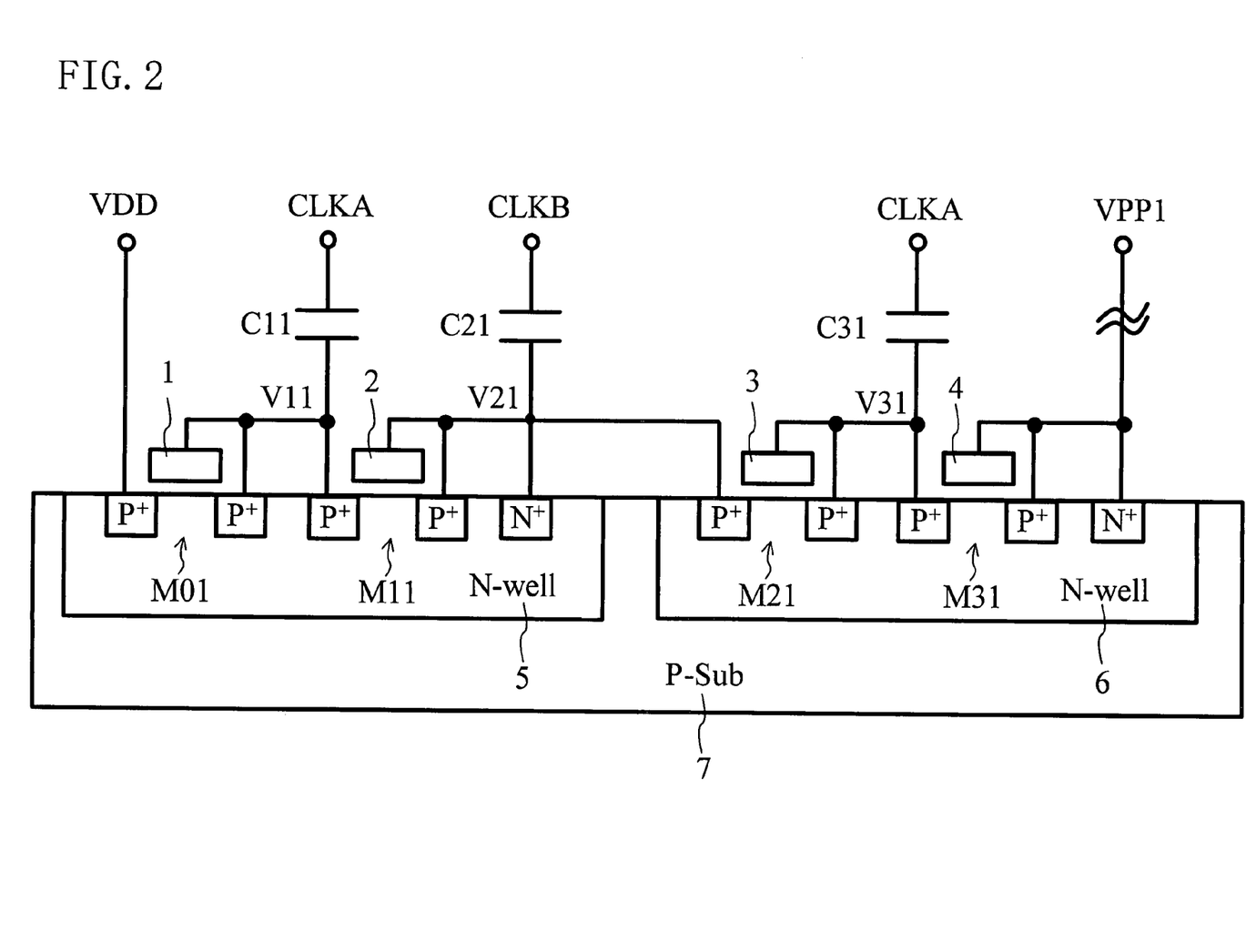
FIG. 2 is a sectional view showing an element arrangement in the charge-pump circuit in Embodiment 1 of the present invention.
Figure 3:
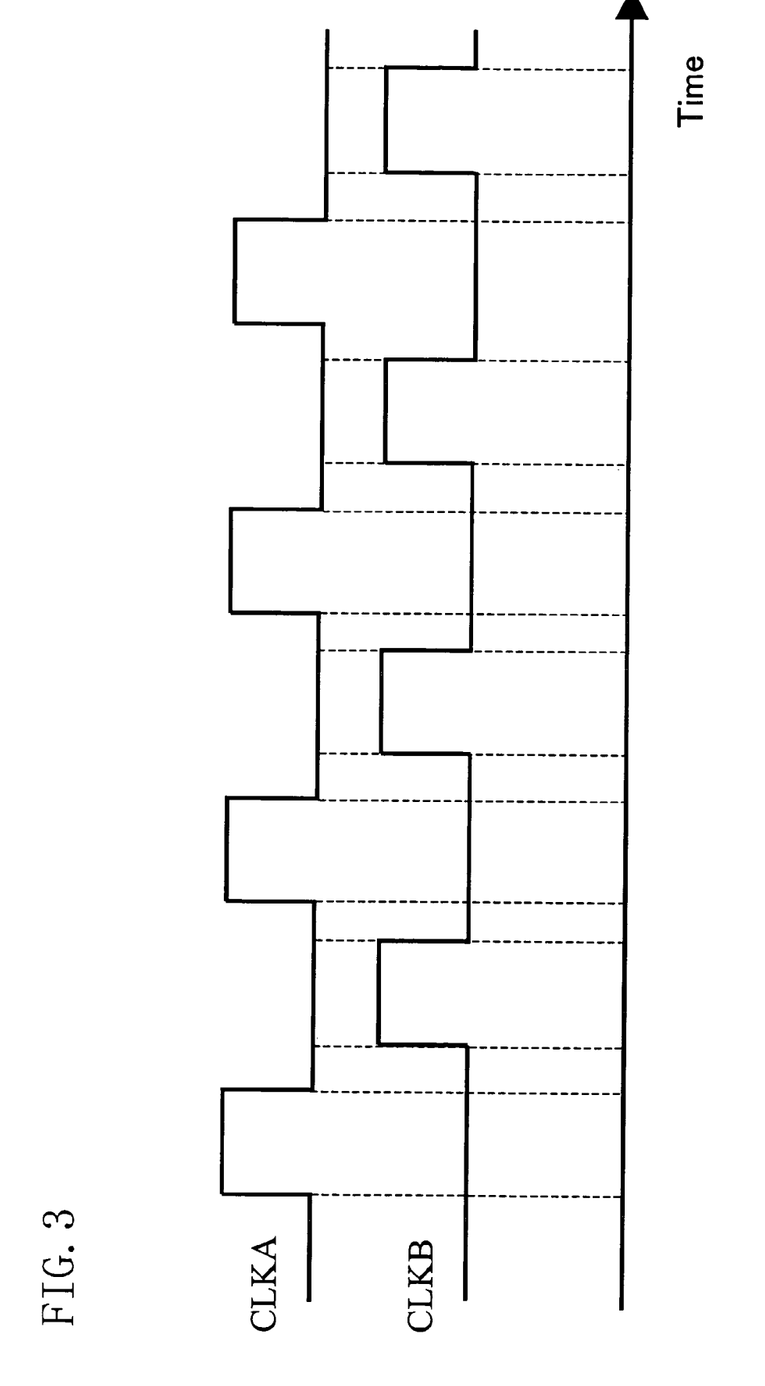
FIG. 3 is a chart showing clock signal timing of the charge-pump circuit in Embodiment 1 of the present invention.

FIG. 1 is a circuit diagram showing a configuration of a charge-pump circuit in Embodiment 1 of the present invention. FIG. 2 is a sectional view showing an element arrangement in the charge-pump circuit in Embodiment 1 of the present invention. Reference numerals 1 to 4 each denote a gate, 5 and 6 each denote an N-type well region, and 7 denotes a P-type silicon substrate. As shown in FIG. 2, the charge-pump circuit uses PMOS transistors formed in the N-type well regions. The charge-pump circuit is of two-phase clock signal type and composed of capacitors Cp (C11, C21, C31) and drive transistors M (M01, M11, M21, M31). A clock signal CLKA and an inverted signal CLKB which is an inversion of the signal CLKA are applied to respective one ends of the associated capacitors for driving the drive transistors. Herein, a case with four PMOS transistors (M01, M11, M21, M31) as the drive transistors and three stages of capacitors (C11, C21, C31) is presented. The drive transistors M01, M11, M21, M31 are connected in series, diffusion layers between the respective transistors are connected to respective one ends of the capacitors Cp for boosting, and the other ends thereof receive the clock signals. The clock signals in two-phase combination of CLKA and CLKB shown in FIG. 3 are applied. The drive transistors (M01, M11, M21, M31) each have a MOS structure in which the drain and the gate are connected to each other. In this charge-pump circuit, a voltage at a preceding stage is superimposed on a succeeding booster cell sequentially according to the clock signals CLKA and CLKB so that a desired voltage can be obtained in the booster cell at the final stage.

A boosted voltage will be described next. In FIG. 1, the threshold voltages of the drive transistors (M01, M11, M21, M31) are set to Vt0, Vt1, Vt2, and Vt3, respectively. The power supply voltage is set to VDD, and the voltage amplitude of the clock signals applied to the capacitors is set to VDD. When a boosting operation starts, a potential of (VDD−Vt0+VDD), a potential of (VDD−Vt0+VDD−Vt1+VDD), and a potential of (VDD'Vt0+VDD−Vt1+VDD−Vt2+VDD) are given to a node V11, a node V21, and a node V31, respectively, and a boosted voltage VPP1 as a drain potential of the drive transistor M31 at the final stage is raised to a potential of:

$VPP1=(VDD-Vt0)+VDD\times3-(Vt1+Vt2+Vt3)$.

In a case with n-stage drive transistors, the boosted voltage VPP1 as a drain voltage of the n-th drive transistor is raised to a potential of:

$VPP1=(VDD-Vt0)+VDD\times n-(Vt1+Vt2+Vt3+\ldots +Vtn)$.

Figure 4:
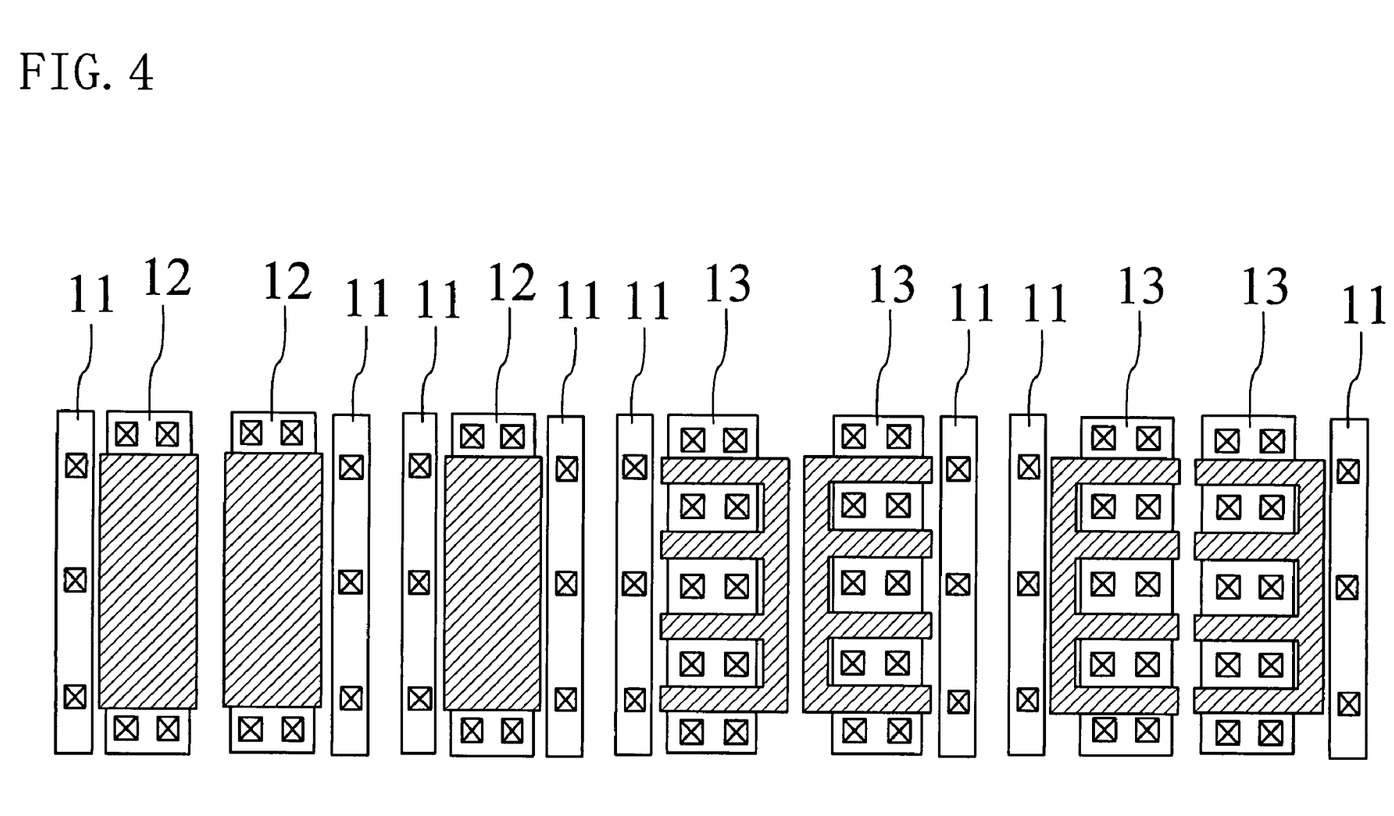
FIG. 4 is a layout diagram of the charge-pump circuit (using N-type DMOS capacitors) in Embodiment 1 of the present invention.

FIG. 4 is a layout diagram in a case using N-type depletion MOSs (DMOSs) as the capacitors in the charge-pump circuit in Embodiment 1 of the present invention. Herein, reference numeral 11 denotes a well contact region of a drive PMOS transistor for providing a well potential, 12 denotes an N-type DMOS capacitor, and 13 denotes the drive PMOS transistor. In the charge-pump circuit in the present invention, a pair of drive PMOS transistors M01 and M11 share a well contact region and another pair of PMOS transistors M21 and M31 share another well contact region, resulting in reduction in layout area.

As described above, the charge-pump circuit in Embodiment 1 of the present invention includes a plurality of stages each including a MOS transistor and a capacitor of which one end is connected to one of a drain and a source of the MOS transistor, the plurality of stages are connected with each other by cascade connection of the MOS transistors, a gate of the MOS transistor is connected electrically to one of the drain and the source thereof in each stage, and a substrate for at least one pair of adjacent MOS transistors are connected electrically to one of the drain and the source of one of the pair. Accordingly, even though the boosted voltage becomes high, the back bias effect is minimized and an increase in threshold voltages of the drive transistors is suppressed. As a result, the charge-pump circuit in the present invention shown in FIG. 1 has charge-pump efficiency that is not degraded. Further, substrate sharing by at least one pair of adjacent PMOS transistors in the charge-pump circuit eliminates the need of a substrate isolation region (well isolation), leading to reduction in layout area.

Figure 5:
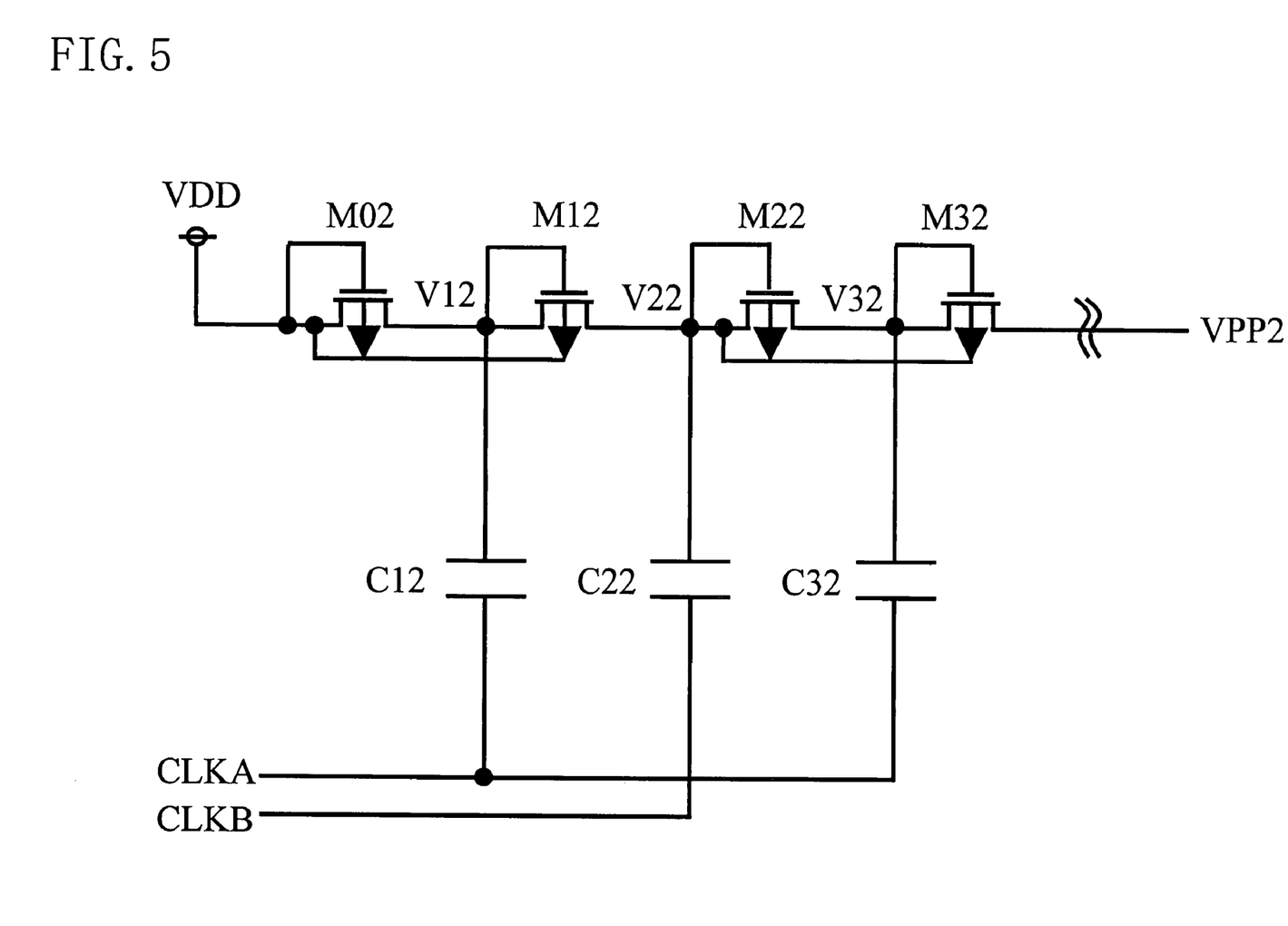
FIG. 5 is a circuit diagram showing a configuration of a charge-pump circuit in Embodiment 2 of the present invention.
Figure 6:
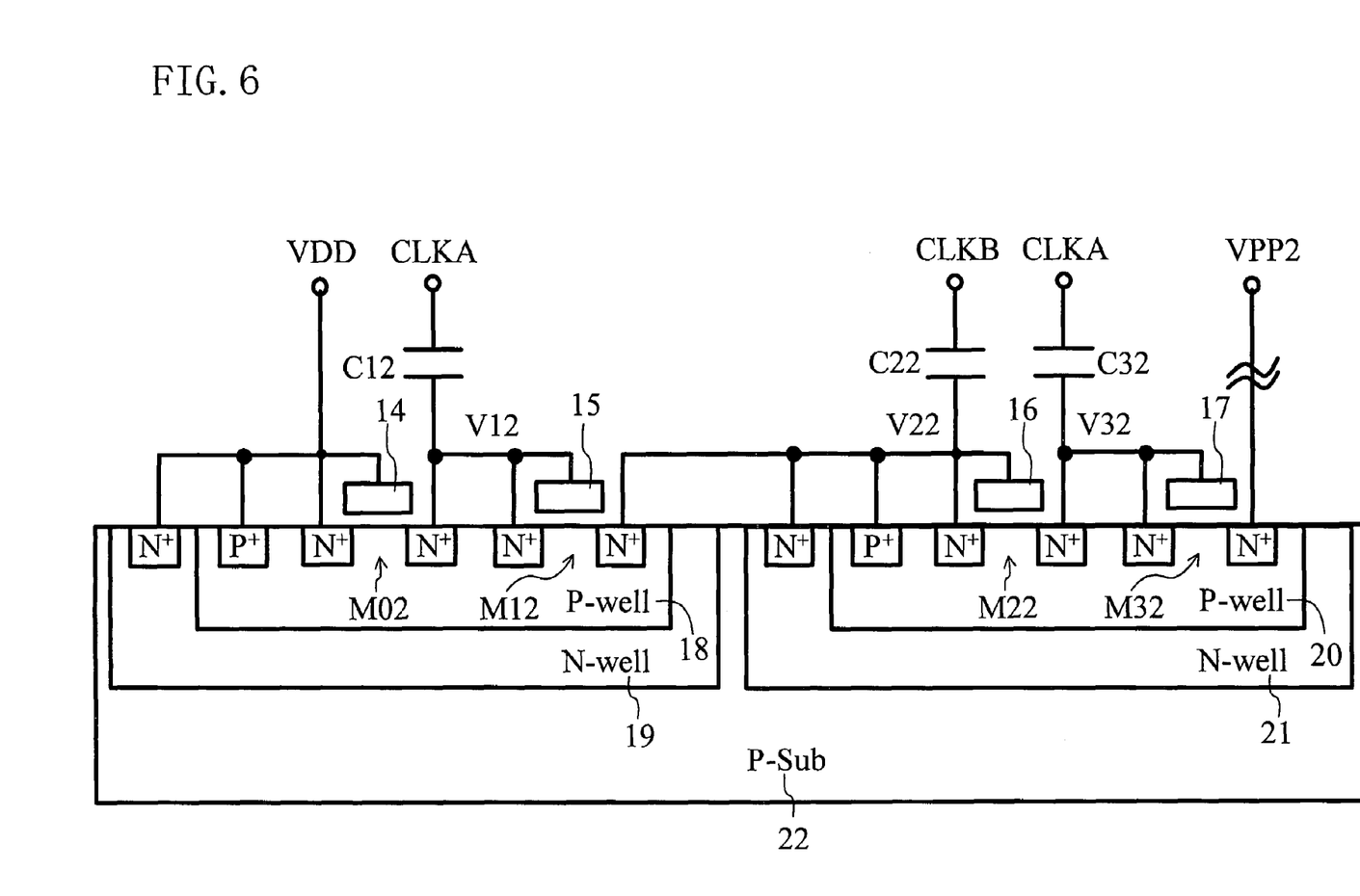
FIG. 6 is a sectional view showing an element arrangement in the charge-pump circuit in Embodiment 2 of the present invention.

FIG. 5 is a circuit diagram showing a configuration of a charge-pump circuit in Embodiment 2 of the present invention. FIG. 6 is a sectional view showing an element arrangement in the charge-pump circuit in Embodiment 2 of the present invention. Herein, reference numerals 14, 15, 16, and 17 each denote a gate, 18 and 20 each denote a P-type well region, 19 and 21 each denote an N-type well region, and 22 denotes a P-type silicon substrate. As shown in FIG. 6, the charge-pump circuit uses NMOS transistors formed in a triple well (a P-type well on a N-type well). For using NMOS transistors as the drive MOS transistors (M02, M12, M22, M32) in the charge-pump circuit in the present invention, triple well process is required. The charge-pump circuit is of two-phase clock signal type and is composed of capacitors Cp (C12, C22, C32) and the drive transistors M (M02, M12, M22, M32). A clock signal CLKA and an inverted clock signal CLKB which is an inversion of CLKA are applied to one ends of the associated capacitors. The other end of capacitors (C12, C22, C32) is connected to a node (V12, V22, and V32), respectively. The drain voltage VPP2 of transistor M32 corresponds to a boosted voltage. A case with four drive transistors (M02, M12, M22, M32) and three stages of capacitors is presented herein. The drive transistors (M02, M12, M22, M32) are connected in series, diffusion layers between the respective transistors are connected to respective one ends of the capacitors Cp for boosting, and the other ends thereof receive the clock signals. The clock signals in two-phase combination of CLKA and CLKB shown in FIG. 3 are applied. The drive transistors (M02, M12, M22, M32) each have a MOS structure in which the drain and the gate are connected to each other.

In this charge-pump circuit, voltage at a preceding stage is superimposed on a succeeding booster cell sequentially according to the clock signals CLKA and CLKB so that a desired voltage can be obtained in the booster cell at the n-th stage.

Similarly to the above description, when a boosting operation starts, a potential of (VDD−Vt0+VDD), a potential of(VDD−Vt2+VDD−Vt1+VDD), and a potential of(VDD−Vt0+VDD−Vt1+VDD−Vt2+VDD) are given to a node V13, a node V23, and a node V33, respectively. The drain voltage VPP3 of transistor M33 corresponds to a boosted voltage. The nodes of succeeding stages have higher voltages. Therefore, there are provided the one capacitor C13 in the first stage, the two capacitors C23a, C23b connected in series in the second stage, and the three capacitors C33a, C33b, C33c connected in series in the third stage so that a voltage applied to the respective ends of each capacitor is divided, thereby suppressing degradation of breakdown voltage of the capacitors. The number of the capacitors connected in series in each stage is determined with the maximum voltage to be applied to the node of each stage, the TDDB characteristic of the capacitors, and the like taken into consideration. With the above described arrangement of the capacitors, degradation of the breakdown voltages of the capacitors can be suppressed and the charge-pump circuit can be mounted with no additional mask necessitated in the advanced CMOS standard process.

Figure 7:
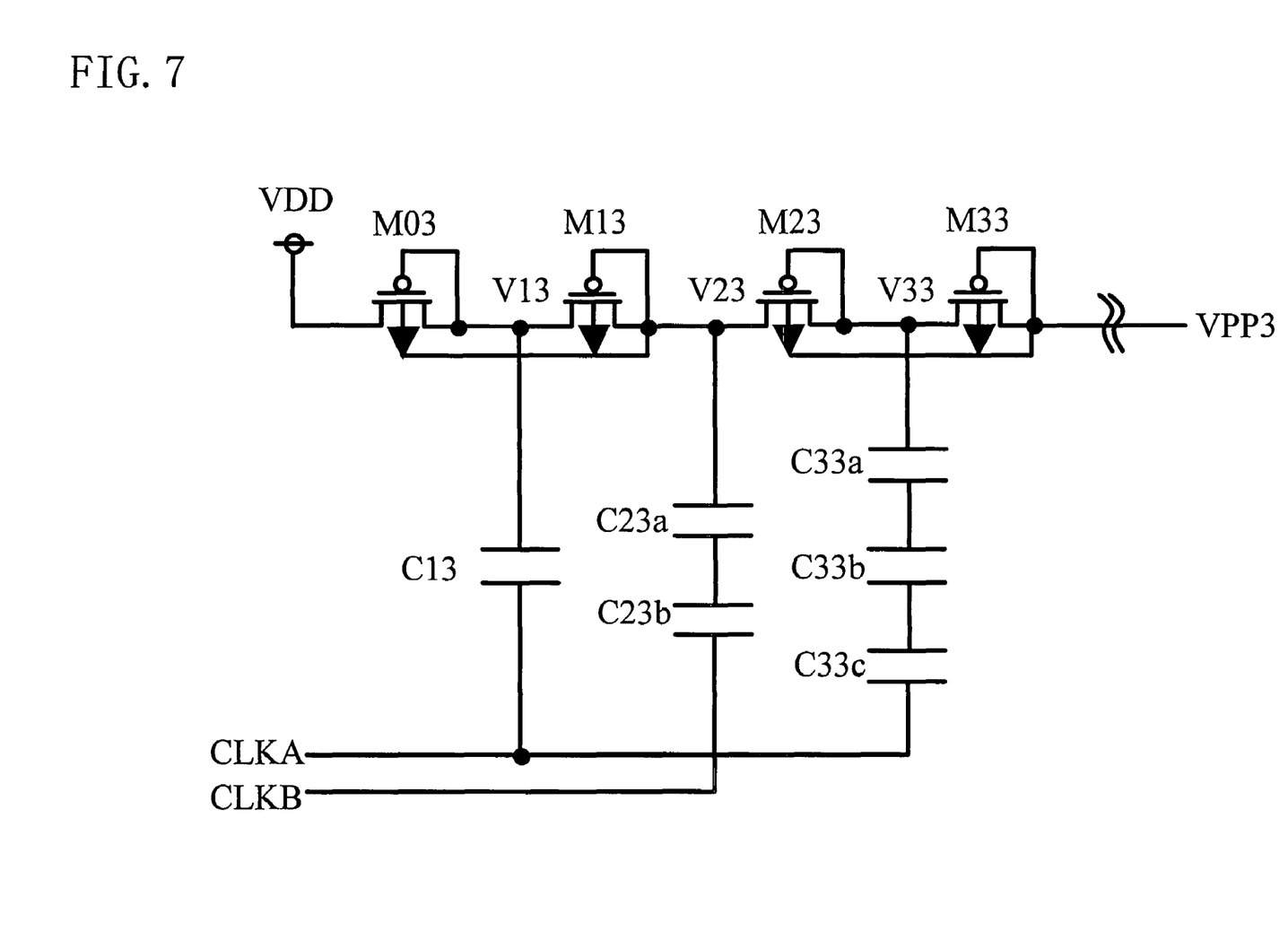
FIG. 7 is a circuit diagram showing a configuration of a charge-pump circuit in Embodiment 3 of the present invention.

FIG. 7 is a circuit diagram showing a configuration of a charge-pump circuit in Embodiment 3 of the present invention. Respective stages thereof include PMOS transistors (M03, M13, M23, M33) and capacitors of which one ends are connected to one of the sources and the drains of the PMOS transistors (M03, M13, M23, M33), wherein one capacitor C13 is provided in the first stage, two capacitors C23a, C23b connected in series are provided in the second stage, and three capacitors C33a, C33b, C33c connected in series are provided in the third stage.

Similarly to the above description, when a boosting operation starts, a potential of (VDD−Vt0+VDD), a potential of (VDD−Vt0+VDD−Vt1+VDD), and a potential of (VDD−Vt0+VDD−Vt1+VDD−Vt2+VDD) are given to a node V13, a node V23, and a node V33, respectively. The nodes of succeeding stages have higher voltages. Therefore, there are provided the one capacitor C13 in the first stage, the two capacitors C23a, C23b connected in series in the second stage, and the three capacitors C33a, C33b, C33c connected in series in the third stage so that a voltage applied to the respective ends of each capacitor is divided, thereby suppressing degradation of breakdown voltage of the capacitors. The number of the capacitors connected in series in each stage is determined with the maximum voltage to be applied to the node of each stage, the TDDB characteristic of the capacitors, and the like taken into consideration. With the above described arrangement of the capacitors, degradation of the breakdown voltages of the capacitors can be suppressed and the charge-pump circuit can be mounted with no additional mask necessitated in the advanced CMOS standard process.

Figure 8:
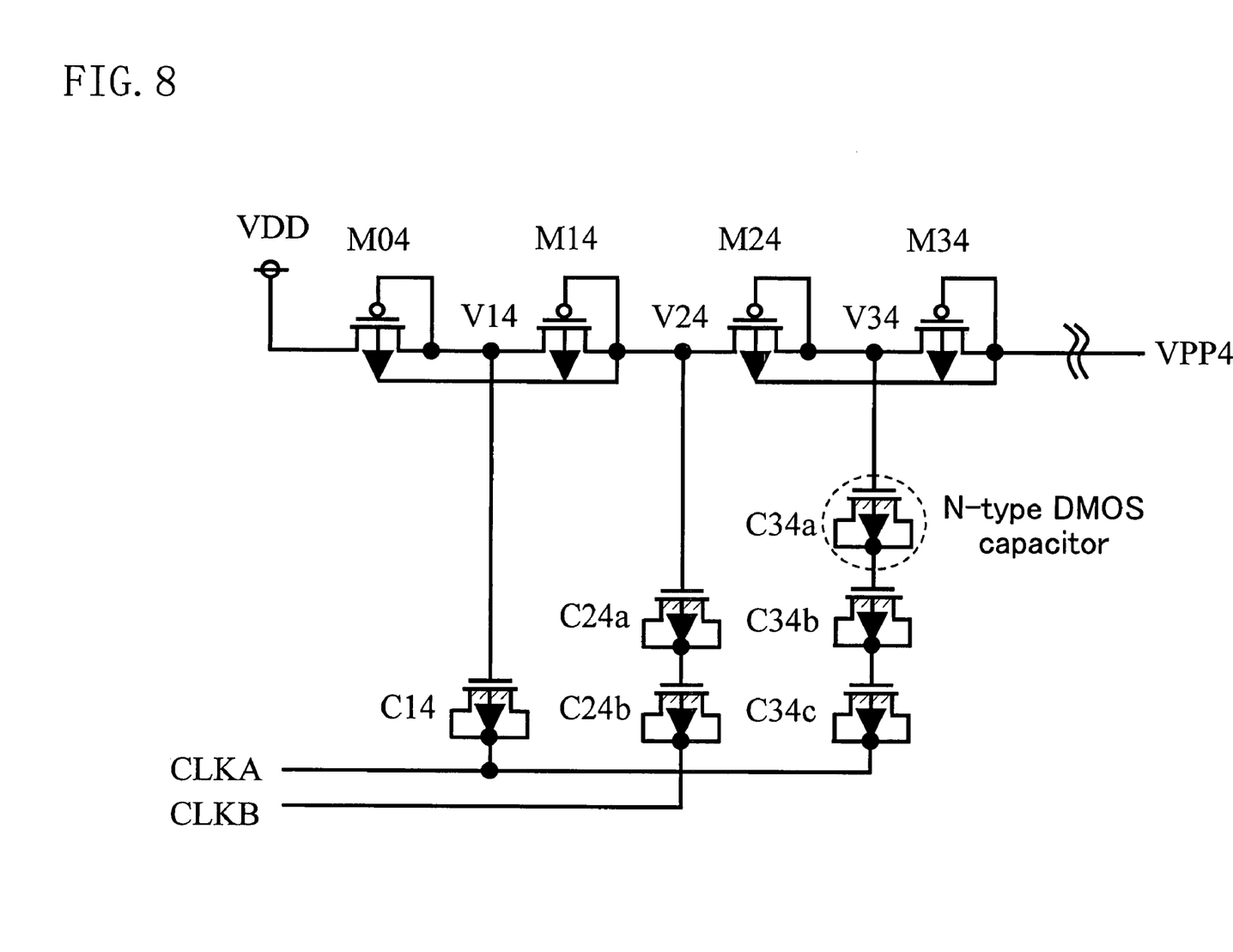
FIG. 8 is a circuit diagram showing a configuration of a charge-pump circuit in Embodiment 4 of the present invention.

FIG. 8 is a circuit diagram showing a configuration of a charge-pump circuit in Embodiment 4 of the present invention. Transistors (M04, M14, M24, M34) are used as transistors of this charge-pump circuit. N-type DMOS capacitors are used as capacitors (C14, C24a, C24b, C34a, C34b, C34c) of this charge-pump circuit, wherein there are provided an N-type DMOS capacitor C14 in the first stage, N-type DMOS capacitors C24a, C24b in the second stage, and N-type DMOS capacitors C34a, C34b, C34c in the third stage. In a case using N-type DMOS capacitors as booster capacitors, stable channel inversion capacitance can be obtained by connecting the gates of the N-type DMOS capacitors to the high voltage side, namely, nodes V14, V24, and V34 and connecting the N-type wells to the low voltage side (CLKA, CLKB), as shown in FIG. 8. The drain voltage VPP4 of transistor M34 corresponds to a boosted voltage.

Figure 9:
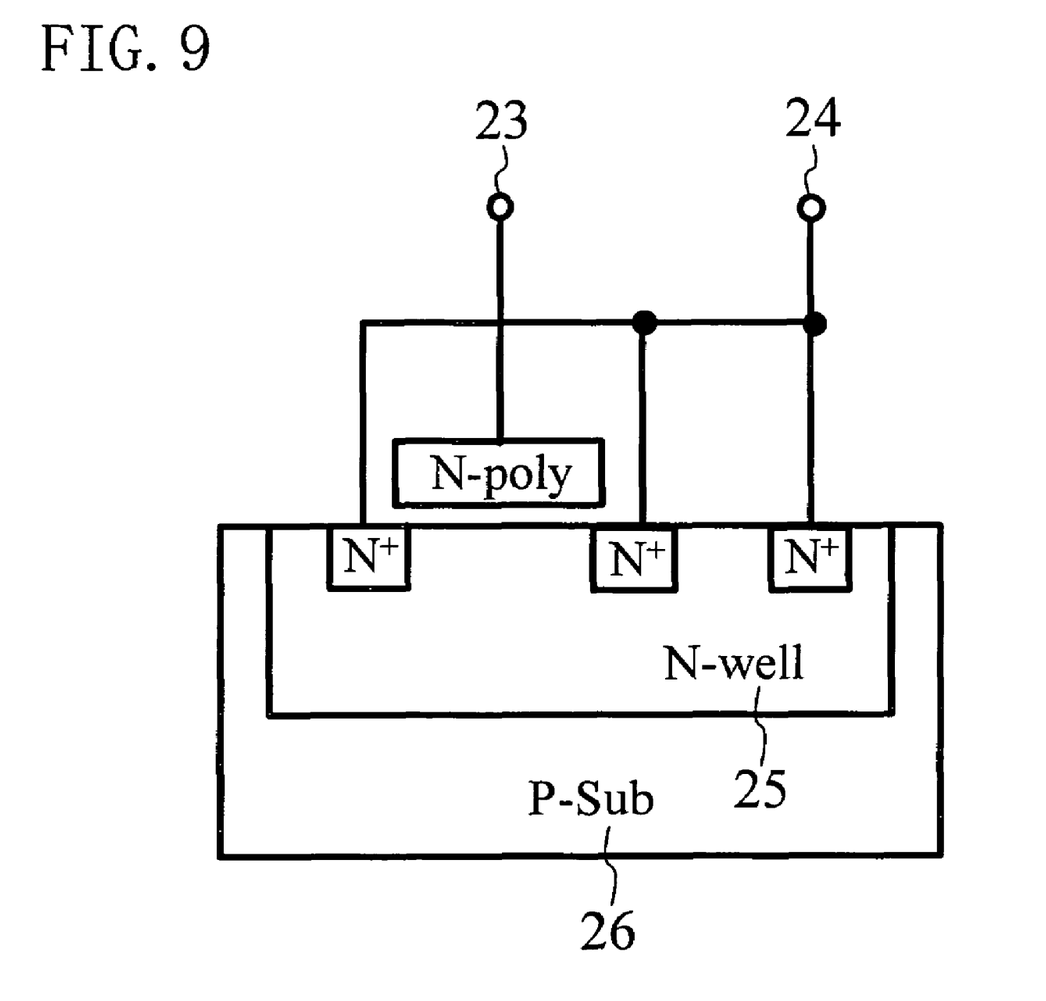
FIG. 9 is a sectional view showing an N-type DMOS capacitor of the charge-pump circuit in Embodiment 4 of the present invention.

FIG. 9 is a sectional view of an N-type DMOS capacitor used in the charge-pump circuit in Embodiment 4 of the present invention. Reference numeral 23 denotes a gate terminal of the N-type DMOS capacitor, 24 denotes an N-type well (diffusion layer) terminal of the N-type DMOS capacitor, 25 denotes an N-type well region, and 26 denotes a P-type silicon substrate.

Figure 10:
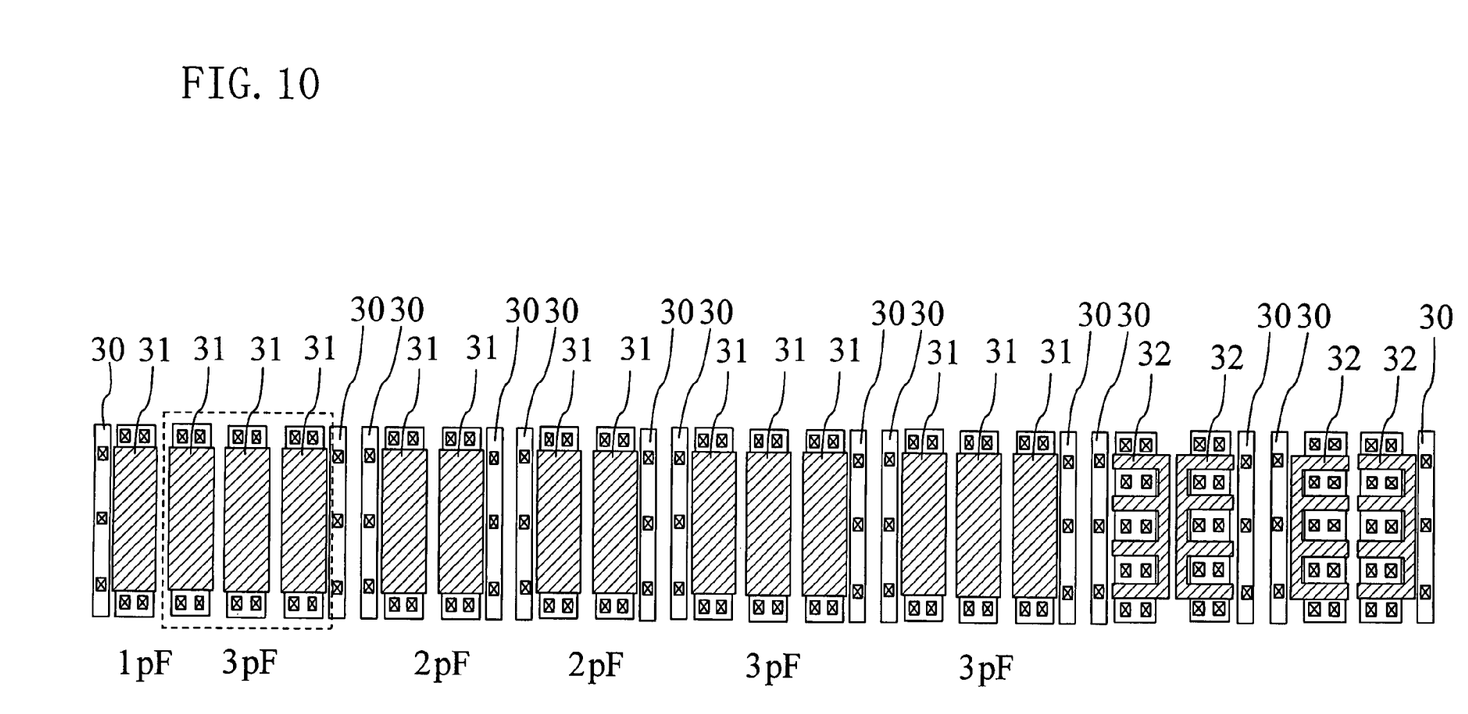
FIG. 10 is a layout diagram of the charge-pump circuit (using N-type DMOS capacitors) in Embodiment 4 of the present invention.

FIG. 10 is a layout diagram of the charge-pump circuit in Embodiment 4 of the present invention. Herein, reference numeral 30 denotes a well contact region, 31 denotes a capacitor, and 32 denotes a drive MOS transistor. One booster capacitor shown in FIG. 9 has a capacitance of 1 pF, namely, C14 has a capacitance of 1 pF, a combination of C24a and C24b has a combined capacitance of 2 pF, and a combination of C34a, C34b, and C34c has a combined capacitance of 3 pF in FIG. 8. In the charge-pump circuit in the present invention shown in FIG. 8, the wells of the drive PMOS transistors (M04, M14, M24, M34) are connected in common to each other, which eliminates the need to provide a well isolation region, resulting in reduction in layout area of the charge-pump circuit.

Figure 11:
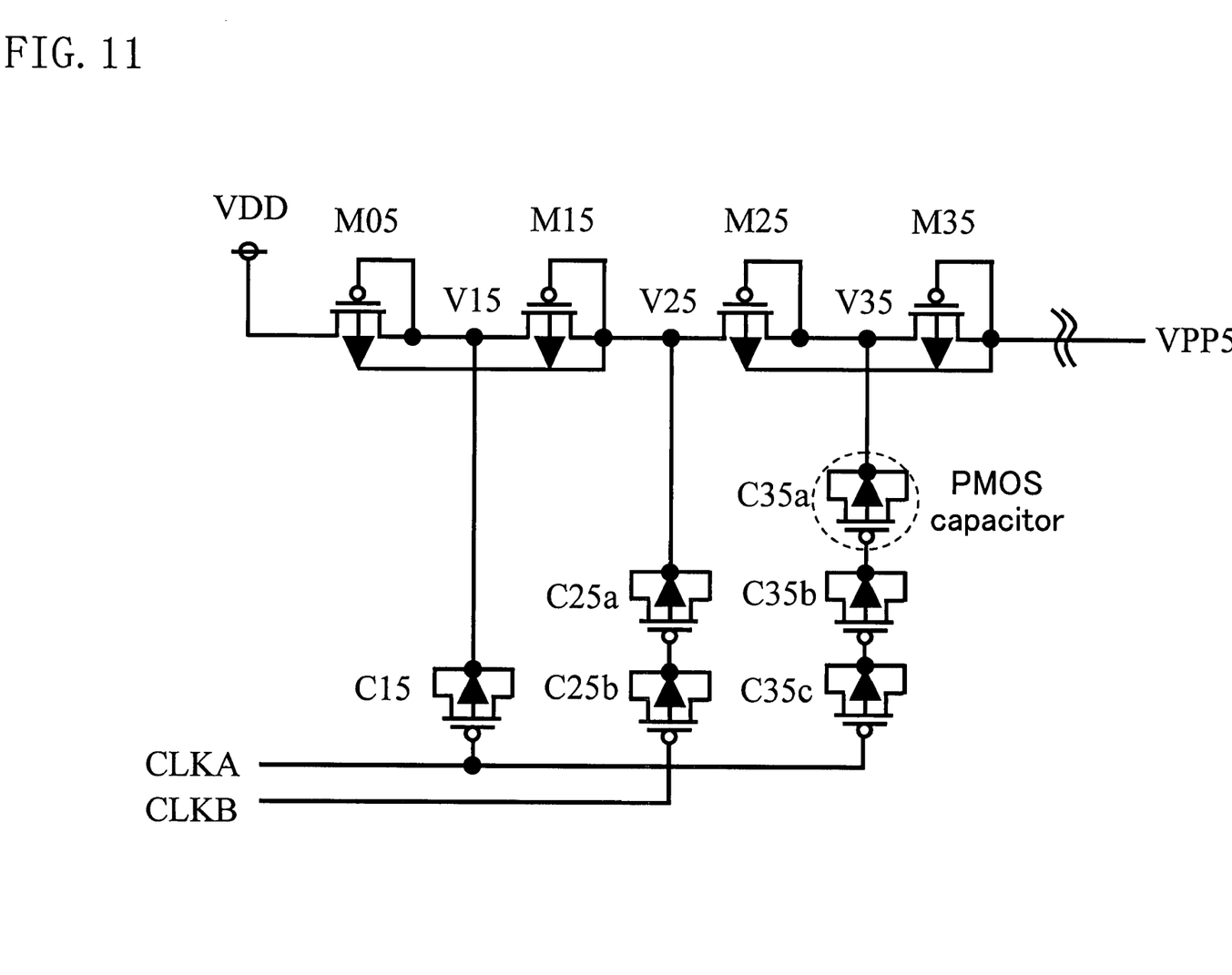
FIG. 11 is a circuit diagram showing a configuration of a charge-pump circuit in Embodiment 5 of the present invention.

FIG. 11 is a circuit diagram showing a configuration of a charge-pump circuit in Embodiment 5 of the present invention. Transistors (M05, M15, M25, M35) are used as transistors of this charge-pump circuit, PMOS capacitors (C15, C25a, C25b, C35a, C35b, C35c) are used as capacitors of this charge-pump circuit, wherein there are provided a PMOS capacitor C15 in the first stage, PMQS capacitors C25a, 25b in the second stage, and PMOS capacitors C35a, C35b, C35c in the third stage. In a case using PMOS capacitors as booster capacitors, stable channel inversion capacitance can be obtained by connecting the gates of the PMOS capacitors to the low voltage side (CLKA, CLKB) and connecting the N-type wells to the high voltage side, namely, the nodes (V15, V25, V35), as shown in FIG. 11. The drain voltage VPP5 of transistor M35 corresponds to a boosted voltage.

In each of the above embodiments, the use of a MOS transistor in each stage which is fabricated by the same process as that for fabricating a MOS transistor for an input/output circuit of an LSI achieves a charge-pump circuit capable of being incorporated in an advanced standard CMOS process LSI.

As described above, the charge-pump circuit according to the present invention is useful as a charge-pump circuit built in a nonvolatile memory in a standard CMOS process LSI.

What is claimed is:

1. A charge-pump circuit comprising a plurality of stages each including a MOS transistor and a capacitor of which one end is connected to one of a drain and a source of the MOS transistor, the plurality of stages being connected with each other by cascade connection of the MOS transistors, wherein:

a gate of the MOS transistor is connected electrically to one of the drain and the source thereof in each stage, a substrate for at least one pair of adjacent MOS transistors is connected electrically to one of the drain and the source of one of the MOS transistors of the at least one pair, a first well region is formed on the substrate for the at least one pair of adjacent MOS transistors a second well region is formed on the substrate, the first and second well regions are N-type well regions isolated from each other and having the same conductivity type, and the at least one pair of adjacent MOS transistors are PMOS transistors, and the capacitor comprises an N-type depletion MOS transistor:

the capacitor of at least one stage is composed of three or more of the N-type depletion MOS transistors connected in series, and the N-type depletion MOS transistor of each stage is fabricated by the same process as that for fabricating a MOS transistor for an input/output circuit of an LSI.

2. The charge-pump circuit of claim 1, wherein paired clock signals of which phases are inverse to each other are input to the other ends of the capacitors of successive two stages.

* * * * *